United States Patent
Heshmati et al.

(10) Patent No.: US 9,588,006 B2
(45) Date of Patent: Mar. 7, 2017

(54) SYSTEMS AND METHODS FOR PRESSURE SENSOR CALIBRATION

(71) Applicant: Invensense Inc., San Jose, CA (US)

(72) Inventors: Ardalan Heshmati, Saratoga, CA (US); Karthik Katingari, Milpitas, CA (US)

(73) Assignee: InvenSense, Inc., San Jose, CA (US)

(*) Notice: Subject to any disclaimer, the term of this patent is extended or adjusted under 35 U.S.C. 154(b) by 237 days.

(21) Appl. No.: 14/498,896

(22) Filed: Sep. 26, 2014

(65) Prior Publication Data

US 2016/0091385 A1   Mar. 31, 2016

(51) Int. Cl.
*G01L 27/00* (2006.01)
(52) U.S. Cl.
CPC .................... *G01L 27/005* (2013.01)
(58) Field of Classification Search
CPC ................ G01L 27/00; G01L 27/005
See application file for complete search history.

(56) References Cited

U.S. PATENT DOCUMENTS

| | | | | |
|---|---|---|---|---|
| 2014/0102169 A1* | 4/2014 | Yoneyama | ............ | G01L 27/002 73/1.59 |
| 2015/0039249 A1* | 2/2015 | Heinrich | ................ | G01L 19/02 702/50 |
| 2015/0127287 A1* | 5/2015 | Wolf | ..................... | G01K 19/00 702/98 |

* cited by examiner

*Primary Examiner* — Nguyen Ha
(74) *Attorney, Agent, or Firm* — Bay Area Technology Law Group PC (57) ABSTRACT

Systems and methods are disclosed for calibrating a pressure sensor associated with a mobile device. Location information may be determined for the mobile device and used to obtain reference pressure information. The reference pressure information may then be used to calibrate the pressure sensor. Additionally, when the pressure sensor of the mobile device has been calibrated, output from the pressure sensor may be used as reference pressure information by another device.

30 Claims, 5 Drawing Sheets

SYSTEMS AND METHODS FOR PRESSURE SENSOR CALIBRATION

FIELD OF THE PRESENT DISCLOSURE

This disclosure generally relates to the calibration of sensors and more specifically to the calibration of a pressure sensor in a mobile device.

BACKGROUND

The development of microelectromechanical systems (MEMS) has enabled the incorporation of a wide variety of sensors into mobile devices, such as cell phones, laptops, tablets, gaming devices and other portable, electronic devices. Notably, information from pressure sensors may be used in a wide variety of applications including sports, fitness, navigation and others. Pressure sensors may be used to measure relative or absolute altitude through the analysis of changes in the atmospheric pressure and may be particularly useful when combined with information from other sensors. For example, motion sensors such as accelerometers or gyroscopes measure linear force or angular velocity along one or more orthogonal axes. A sensor fusion algorithm then may be used to combine data from these sources with the altitude information provided by the pressure sensor. As desired, data from additional sensors may also be combined, such as heading information derived from a magnetometer. Pressure sensor data may also be used in other applications, such as weather forecasting, environmental monitoring and others. However, as with other sensors, the value of information from a pressure sensor is directly related to its accuracy.

Accordingly, it would be desirable to provide systems and methods for calibrating a pressure sensor in a mobile device. Further, when calibrated pressure sensor data is available for a mobile device, it would also be desirable to facilitate the calibration of pressure sensors in other devices. As described in the following materials, this disclosure satisfies these and other goals.

SUMMARY

As will be described in detail below, this disclosure includes a method for calibrating a pressure sensor associated with a mobile device. The method may include determining location information for the mobile device, receiving reference pressure information from an external source based at least in part on the determined location information, measuring pressure with the pressure sensor and calibrating the pressure sensor using the measured pressure and the reference pressure information.

In one aspect, at least one of the reference pressure information and the measured pressure may be compensated with an additional environmental variable. The additional environmental variable may be measured with an environmental sensor associated with the mobile device. The reference pressure information and the measured pressure may be contemporaneous or may correspond to different time periods.

In one aspect, the pressure sensor may be integrated with the mobile device.

In one aspect, the pressure sensor may be in a separate device such that a personal area network (PAN) is formed between the pressure sensor and the mobile device to communicate the measured pressure.

In one aspect, the reference pressure information may be received from a server configured to correlate pressure information and location. Alternatively or in addition, the reference pressure information may be determined by another mobile device. Further, the reference pressure information may be received from the other mobile device when the other mobile device is within a threshold proximity. Also further, the reference pressure information determined by the other mobile device may be aggregated by a server, such that the reference pressure information is received from the server.

In one aspect, a calibrated measured pressure may be transmitted as reference pressure information. An additional environmental variable corresponding to the calibrated measured pressure may also be transmitted.

In one aspect, reference pressure information may be received from a plurality of external sources.

In one aspect, the pressure sensor calibration may be updated with subsequently received reference pressure information.

In one aspect, a usage condition for the pressure sensor may be determined and the calibration adjusted based at least in part on the determined usage condition. Further, motion sensor data from at least one sensor associated with the mobile device may be processed to determine the usage condition.

This disclosure also includes a system for calibrating a pressure sensor, including a mobile device, a pressure sensor associated with the mobile device configured to measure pressure, a location module configured to determine location information for the mobile device and a calibration manager configured to receive reference pressure information from an external source based at least in part on the determined location information such that the calibration manager may calibrate the pressure sensor using the reference pressure information. Further, the calibration manager may compensate at least one of the reference pressure information and the measured pressure with an additional environmental variable. An environmental sensor may be associated with the mobile device to measure the additional environmental variable.

In one aspect, the calibration manager may use reference pressure information that corresponds to a different time period than the measured pressure.

In one aspect, the pressure sensor may be integrated with the mobile device. Alternatively, the pressure sensor and the mobile device may be separate and include a personal area network (PAN) configured to communicate the measured pressure.

In one aspect, the calibration manager may receive reference pressure information from a server that correlates pressure information and location. Alternatively or in addition, the calibration manager may receive reference pressure information determined by another mobile device. The calibration manager may receive the reference pressure information from the other mobile device when the other mobile device is within a threshold proximity. Further, the calibration manager may receive the reference pressure information from a server that aggregates the pressure information determined by the other mobile device.

In one aspect, the calibration manager may transmit a calibrated measured pressure as reference pressure information. An environmental sensor may be associated with the mobile device to measure an additional environmental variable, such that the calibration manager transmits the measured additional environmental variable with the calibrated measured pressure.

In one aspect, the calibration manager may receive reference pressure information from a plurality of external sources.

In one aspect, the calibration manager may update the pressure sensor calibration with subsequently received reference pressure information.

In one aspect, the calibration manager may determine a usage condition for the pressure sensor and adjust the calibration based at least in part on the determined usage condition. The calibration manager may determine the usage condition with data from at least one motion sensor associated with the mobile device.

DETAILED DESCRIPTION

At the outset, it is to be understood that this disclosure is not limited to particularly exemplified materials, architectures, routines, methods or structures as such may vary. Thus, although a number of such options, similar or equivalent to those described herein, can be used in the practice or embodiments of this disclosure, the preferred materials and methods are described herein.

It is also to be understood that the terminology used herein is for the purpose of describing particular embodiments of this disclosure only and is not intended to be limiting.

The detailed description set forth below in connection with the appended drawings is intended as a description of exemplary embodiments of the present disclosure and is not intended to represent the only exemplary embodiments in which the present disclosure can be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments of the specification. It will be apparent to those skilled in the art that the exemplary embodiments of the specification may be practiced without these specific details. In some instances, well known structures and devices are shown in block diagram form in order to avoid obscuring the novelty of the exemplary embodiments presented herein.

For purposes of convenience and clarity only, directional terms, such as top, bottom, left, right, up, down, over, above, below, beneath, rear, back, and front, may be used with respect to the accompanying drawings or chip embodiments. These and similar directional terms should not be construed to limit the scope of the disclosure in any manner.

In this specification and in the claims, it will be understood that when an element is referred to as being "connected to" or "coupled to" another element, it can be directly connected or coupled to the other element or intervening elements may be present. In contrast, when an element is referred to as being "directly connected to" or "directly coupled to" another element, there are no intervening elements present.

Some portions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments described herein may be discussed in the general context of processor-executable instructions residing on some form of non-transitory processor-readable medium, such as program modules, executed by one or more computers or other devices. Generally, program modules include routines, programs, objects, components, data structures, etc., that perform particular tasks or implement particular abstract data types. The functionality of the program modules may be combined or distributed as desired in various embodiments.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the exemplary wireless communications devices may include components other than those shown, including well-known components such as a processor, memory and the like.

The techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium comprising instructions that, when executed, performs one or more of the methods described above. The non-transitory processor-readable data storage medium may form part of a computer program product, which may include packaging materials.

The non-transitory processor-readable storage medium may comprise random access memory (RAM) such as synchronous dynamic random access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor. For example, a carrier wave may be employed to carry computer-readable electronic data such as those used in transmitting and receiving electronic mail or in accessing a network such as the Internet or a local area network (LAN). Of course, many modifications may be made to this configuration without departing from the scope or spirit of the claimed subject matter.

The various illustrative logical blocks, modules, circuits and instructions described in connection with the embodiments disclosed herein may be executed by one or more processors, such as one or more motion processing units (MPUs), digital signal processors (DSPs), general purpose microprocessors, application specific integrated circuits (ASICs), application specific instruction set processors (ASIPs), field programmable gate arrays (FPGAs), or other equivalent integrated or discrete logic circuitry. The term "processor," as used herein may refer to any of the foregoing structure or any other structure suitable for implementation of the techniques described herein. In addition, in some aspects, the functionality described herein may be provided within dedicated software modules or hardware modules configured as described herein. Also, the techniques could be fully implemented in one or more circuits or logic elements. A general purpose processor may be a microprocessor, but in the alternative, the processor may be any conventional processor, controller, microcontroller, or state machine. A processor may also be implemented as a combination of computing devices, e.g., a combination of an MPU and a microprocessor, a plurality of microprocessors, one or more microprocessors in conjunction with an MPU core, or any other such configuration.

Unless defined otherwise, all technical and scientific terms used herein have the same meaning as commonly understood by one having ordinary skill in the art to which the disclosure pertains.

Finally, as used in this specification and the appended claims, the singular forms "a," "an" and "the" include plural referents unless the content clearly dictates otherwise.

According to this disclosure, a mobile device may have an integrated pressure sensor or may be associated with an auxiliary device having an integrated pressure sensor. According to the techniques of this disclosure, location information may be determined for the mobile device and used to obtain reference pressure information that is used to calibrate the pressure sensor. Additionally, when the pressure sensor of the mobile device has been calibrated, output from the pressure sensor may be used as reference pressure information by another mobile device.

Figure 1:
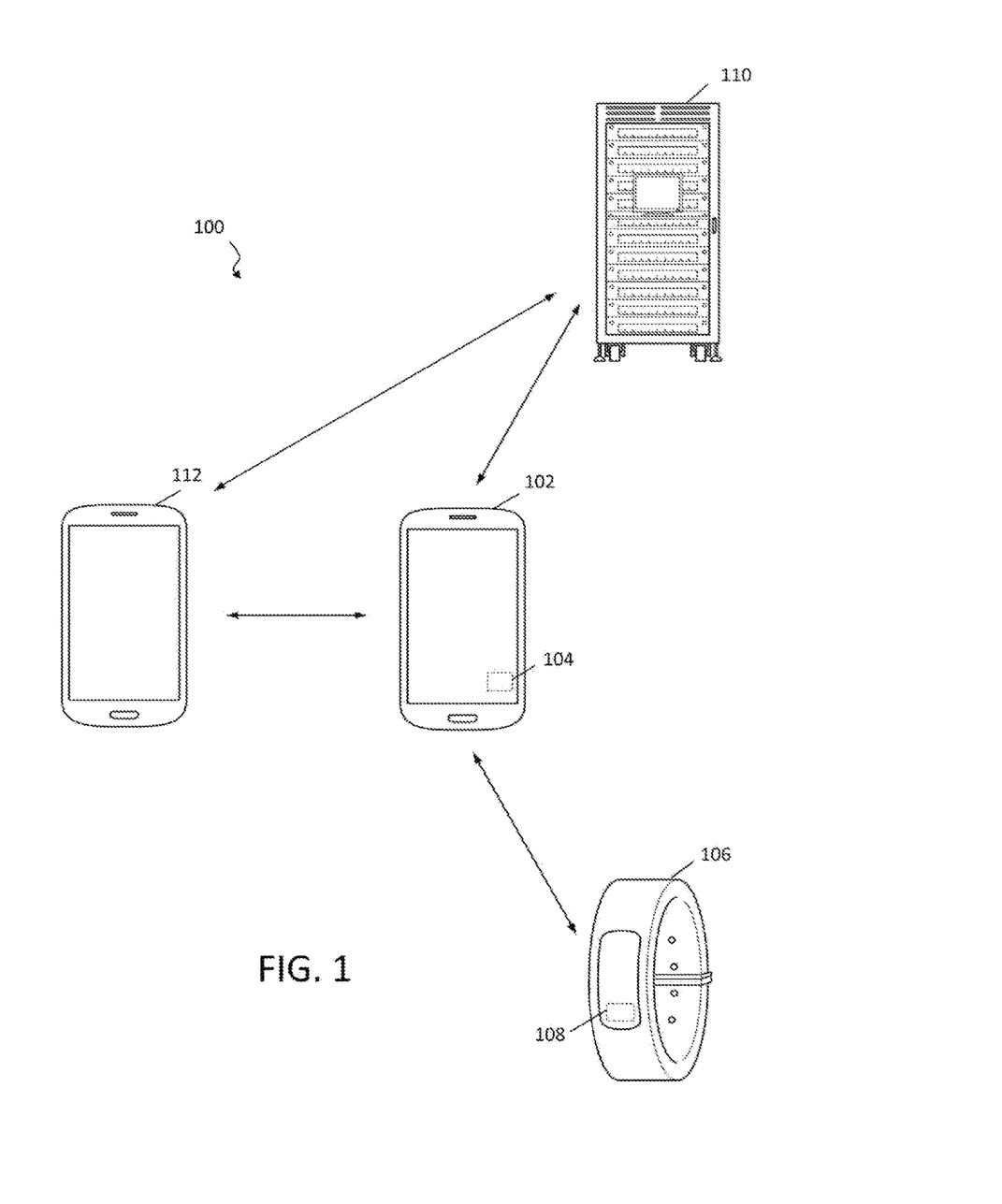
FIG. 1 is schematic diagram of a pressure sensor calibration system according to an embodiment.

These and other aspects may be appreciated in the context of FIG. 1, which shows exemplary embodiments in the context of calibration system 100. Mobile device 102 may include an integrated pressure sensor 104 and/or may be associated with auxiliary device 106 having a pressure sensor 108, communicating over a suitable protocol. In one embodiment, mobile device 102 and auxiliary device 106 may be a smart phone and a wearable, such as a watch, fitness band, or the like. Mobile device 102 and auxiliary device 106 may communicate using a personal area network (PAN), such as a protocol employing wireless communication, such as BLUETOOTH®, ZigBee®, ANT, near field communication (NFC), infrared (IR) or other technology adapted for relatively short-range, power efficient wireless communication, or a wired connection protocol as desired.

Mobile device 102 has location awareness capabilities and may communicate information regarding its determined position to a source of external reference pressure data, as represented by server 110 or another mobile device 112. Based at least in part on its determined position, device 102 may receive reference pressure information from the external source. Device 102 may then use the received reference pressure information to calibrate the pressure sensor. As will be appreciated, server 110 may have a database to correlate location with pressure information, such as may be maintained from weather stations, including National Oceanic and Atmospheric Administration (NOAA) or National Climatic Data Center (NCDC) stations, news stations, airports, or any other suitable source of meteorological information. Server 110 may, additionally or in the alternative, function to aggregate pressure information data in a "crowd-sourced" fashion from other mobile devices, such as device 112. When device 112 has an acceptably calibrated pressure sensor, it may upload pressure information measurements and corresponding location information to be used as reference pressure information to server 110. Subsequently, server 110 may then distribute reference pressure information to mobile device 102 depending upon its determined position. Pressure information includes atmospheric pressure data and may also include data associated with any number of related environmental conditions, such as temperature, humidity, and the like.

Upon receipt of reference pressure information, device 102 may calibrate its pressure sensor 104 and/or pressure sensor 108 on auxiliary device 106, as warranted. In one aspect, device 102 may use reference pressure information corresponding to multiple adjacent locations by performing a suitable weighting operation to interpolate or extrapolate a suitable atmospheric pressure reference measurement for its determined position. In another aspect, device 102 may compensate the received reference pressure information using locally-sensed environmental conditions, such as temperature and/or humidity. Device 102 may receive pressure information used for calibration from an individual source or any combination and number of external sources as exemplified by other device 112 and server 110. In one aspect, reference pressure information may be contemporaneous within a suitable margin. In another aspect, reference pressure information may correspond to a time period different from when device 102 calibrates its pressure sensor. In another aspect, server 110 may use reference pressure information corresponding to multiple adjacent locations by performing a suitable weighting operation to interpolate or extrapolate a suitable atmospheric pressure reference measurement for the determined position of device 102. As warranted, device 102 may apply a compensation based on one or more environmental conditions, such as temperature and/or humidity, when employing non-contemporaneous reference pressure information.

Figure 2:
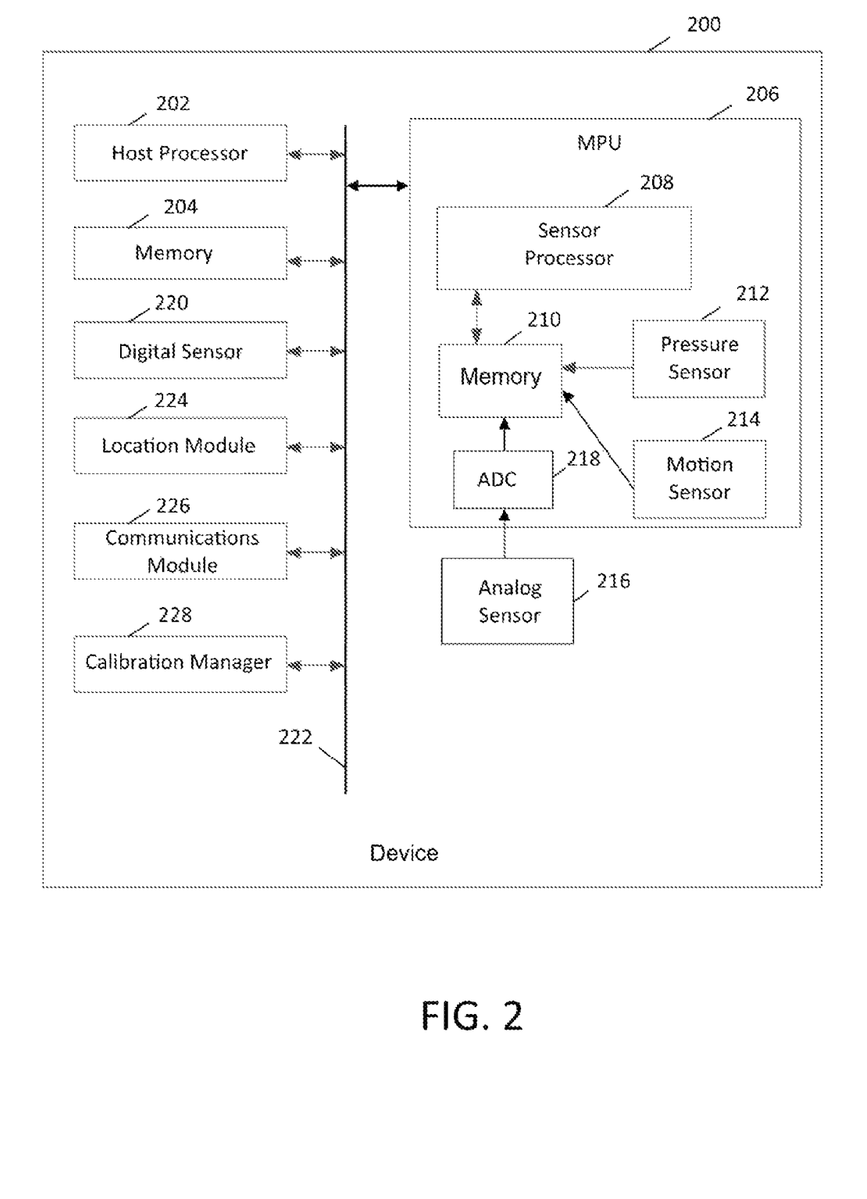
FIG. 2 is schematic diagram of a mobile device with a pressure sensor according to an embodiment.

Details regarding one embodiment of a mobile electronic device 200 including features of this disclosure are depicted as high level schematic blocks in FIG. 2. As will be appreciated, device 102 may be implemented as a device or apparatus, such as a handheld device that can be moved in space by a user and its motion, location and/or orientation in space therefore sensed. For example, such a handheld device may be a mobile phone (e.g., cellular phone, a phone running on a local network, or any other telephone handset), personal digital assistant (PDA), video game player, video game controller, navigation device, mobile internet device (MID), personal navigation device (PND), digital still camera, digital video camera, binoculars, telephoto lens, portable music, video, or media player, remote control, or other handheld device, or a combination of one or more of these devices.

As shown, device 200 includes a host processor 202, which may be one or more microprocessors, central processing units (CPUs), or other processors to run software programs, which may be stored in memory 204, associated with the functions of device 200. Multiple layers of software can be provided in memory 204, which may be any combination of computer readable medium such as electronic memory or other storage medium such as hard disk, optical disk, etc., for use with the host processor 202. For example, an operating system layer can be provided for device 200 to control and manage system resources in real time, enable functions of application software and other layers, and interface application programs with other software and functions of device 200. Similarly, different software application programs such as menu navigation software, games, camera function control, navigation software, communications software, such as telephony or wireless local area network (WLAN) software, or any of a wide variety of other software and functional interfaces can be provided. In some embodiments, multiple different applications can be provided on a single device 200, and in some of those embodiments, multiple applications can run simultaneously.

Device 200 may also include integrated motion processing unit (MPU™) 206 featuring sensor processor 208, memory 210 and pressure sensor 212. Memory 210 may store algorithms, routines or other instructions for processing data output by pressure sensor 212 and/or other sensors as described below using logic or controllers of sensor processor 208, as well as storing raw data and/or motion data output by pressure sensor 212 or other sensors. In this embodiment, MPU 206 also includes motion sensor 214, which may be one or more sensors for measuring motion of device 200 in space. Depending on the configuration, MPU 206 measures one or more axes of rotation and/or one or more axes of acceleration of the device. In one embodiment, at least some of the motion sensors are inertial sensors, such as rotational motion sensors or linear motion sensors. For example, the rotational motion sensors may be gyroscopes to measure angular velocity along one or more orthogonal axes and the linear motion sensors may be accelerometers to measure linear acceleration along one or more orthogonal axes. In one aspect, three gyroscopes and three accelerometers may be employed, such that a sensor fusion operation performed by sensor processor 208 or other processing resources of device 200 combines data from pressure sensor 212 and motion sensor 214 to provide a seven axis determination of motion. As desired, pressure sensor 212 and motion sensor 214 may be implemented using MEMS to be integrated with MPU 206 in a single package. Exemplary details regarding suitable configurations of host processor 202 and MPU 206 may be found in co-pending, commonly owned U.S. patent application Ser. No. 11/774,488, filed Jul. 6, 2007, and Ser. No. 12/106,921, filed Apr. 21, 2008, which are hereby incorporated by reference in their entirety. Further, MPU 206 may be configured as a sensor hub by aggregating sensor data from additional processing layers as described in co-pending, commonly owned U.S. patent application Ser. No. 14/480,364, filed Sep. 8, 2014, which is also hereby incorporated by reference in its entirety. Suitable implementations for MPU 206 in device 200 are available from InvenSense, Inc. of Sunnyvale, Calif.

Device 200 may also include other sensors as desired. As shown, analog sensor 216 may provide output to analog to digital converter (ADC) 218 within MPU 206. Alternatively or in addition, data output by digital sensor 220 may be communicated over bus 222 to sensor processor 206 or other processing resources in device 200. Analog sensor 216 and digital sensor 220 may provide additional sensor data about the environment surrounding device 200. For example, temperature and/or relative humidity sensors may be used to make suitable adjustments to the data from pressure sensor 212 during normal operation or during calibration as desired. In other embodiments, information regarding environmental variables affecting device 200 may be obtained from any suitable source, including externally. For example, information regarding other environmental variables may be included with the reference pressure information. Other sensors, such as one or more magnetometers, infrared sensors, ultrasonic sensors, radio frequency sensors, proximity sensors or other types of sensors can also be provided. In one embodiment, data from a magnetometer measuring along three orthogonal axes may be fused with gyroscope, accelerometer and pressure sensor data to provide a ten axis determination of motion. Although described in the context of one or more sensors being MEMS based, the techniques of this disclosure may be applied to any sensor design or implementation.

As noted above, device 200 also features location awareness capabilities, such as may be provided by location module 224. In general, location awareness refers to the use of any suitable technique to determine the geospatial position of device 200. One of skill in the art will appreciate that any number of technologies may be implemented as desired. Without limitation, examples of suitable location awareness methods include global navigation satellite systems (GNSS), such as global positioning system (GPS), global navigation satellite system (GLONASS), Galileo and Beidou, as well as WiFi™ positioning, cellular tower positioning, Bluetooth™ positioning beacons, dead reckoning or other similar methods. Location module 224 provides a determination of the position of device 200 with sufficient resolution to enable identification of relevant reference pressure information according to the techniques of this disclosure. As will be appreciated, this may include a determination of altitude in addition to latitude and longitude.

Device 200 may also have communications module 226 to enable transfer of reference pressure information with an external source, such as server 110 or other device 112 as described above. Communications module 226 may employ any suitable protocol, including cellular-based and wireless local area network (WLAN) technologies such as Universal Terrestrial Radio Access (UTRA), Code Division Multiple Access (CDMA) networks, Global System for Mobile Communications (GSM), the Institute of Electrical and Electronics Engineers (IEEE) 802.16 (WiMAX), Long Term Evolution (LTE), IEEE 802.11 (WiFi™) and others. In one aspect, location module 224 may determine the position of device 200 based on the proximity indicated by the communication module 226. For example, the communications protocol employed may be associated with a defined range such that the ability of device 200 to communicate with another device represents sufficient proximity to the other device to utilize its reference pressure information in a calibration process.

In the embodiment shown, host processor 202, memory 204, MPU 206 and other components of device 200 may be coupled through bus 136, which may be any suitable bus or interface, such as a peripheral component interconnect express (PCIe) bus, a universal serial bus (USB), a universal asynchronous receiver/transmitter (UART) serial bus, a suitable advanced microcontroller bus architecture (AMBA) interface, an Inter-Integrated Circuit (I2C) bus, a serial digital input output (SDIO) bus, a serial peripheral interface (SPI) or other equivalent. Depending on the architecture, different bus configurations may be employed as desired. For example, additional buses may be used to couple the various components of device 200, such as by using a dedicated bus between host processor 202 and memory 204. As noted above, multiple layers of software may be employed as desired and stored in any combination of memory 204, memory 210, or other suitable location. For example, a motion algorithm layer can provide motion algorithms that provide lower-level processing for raw sensor data provided from the motion sensors and other sensors. A sensor device driver layer may provide a software interface to the hardware sensors of device 200. Further, a suitable application program interface (API) may be provided to facilitate communication between host processor 202 and MPU 206, for example, to transmit desired sensor processing tasks. Other embodiments may feature any desired division of processing between MPU 206 and host processor 202 as appropriate for the applications and/or hardware being employed. For example, lower level software layers may be provided in MPU 206 and an API layer implemented by host processor 202 may allow communication of the states of application programs as well as sensor commands. Some embodiments of API implementations in a motion detecting device are described in co-pending U.S. patent application Ser. No. 12/106,921, incorporated by reference above.

In the depicted embodiment, device 200 includes calibration manager 228 that may be implemented as any suitable combination of hardware and software to process reference pressure information as obtained using communications module 226 and perform one or more calibration routines with respect to pressure sensor 212. As desired, calibration manager 228 may calibrate pressure sensor 212 using reference pressure information corresponding to the position determined for device 200 by location module 224. For example, calibration manager 228 may determine offset values by subtracting a reference pressure and the pressure measured by pressure sensor 212. Other suitable calibration parameters determined by calibration manager 228 may include sensitivity, linearity and/or coefficients associated with related environmental variables such as temperature or humidity. Calibration manager 228 may also use reference pressure information corresponding to multiple adjacent locations by performing a suitable weighting operation to interpolate or extrapolate a suitable atmospheric pressure reference measurement for its determined position. In another aspect, calibration manager 228 may compensate the received reference pressure information using locally-sensed environmental conditions, such as temperature and/or humidity. Further, the reference pressure information may be contemporaneous within a suitable margin or may correspond to a different time period. When employing non-contemporaneous reference pressure information, a compensation based on one or more environmental conditions, such as temperature and/or humidity, may be applied.

Calibration manager 228 may also use communications module 226 to transmit information determined by pressure sensor 212 after it has been suitably calibrated, as well as information from any other sensors as desired, together with the determined position to server 110 or other device 112 for use as reference pressure information.

In a further aspect, calibration manager 228 may be configured to determine a usage condition for device 200 and adjust calibration operations accordingly. In this context, a usage condition is anything that may be predicted to perturb or alter the pressure sensor data. For example, if device 200 includes a transceiver, ongoing transmissions may cause an increase in temperature of the device. As another example, if device 200 is determined to be in a pocket or other enclosed location, confidence in the validity of pressure measurements may be reduced. Still further, a usage condition may be determined directly or indirectly from location module 224. In one embodiment, location manager 224 may determine a position with sufficient accuracy to allow calibration manager 228 to assume device 200 is in an indoor location or other position expected to impact measured pressure. As another example, location manager 228 may involve GNSS such that an analysis of the number and quality of received signals may allow a determination that device 200 is indoors. In yet another aspect, motion sensor 214 may be used to determine a usage condition of device 200. Correspondingly, depending upon the determined usage condition, calibration manager 228 may apply a compensation, defer matching to a more advantageous time or perform any other operation that may be warranted by the anticipated effect of the usage condition on the pressure sensor 212.

Aspects of calibration manager 228 may be implemented in software, which includes, but is not limited to, application software, firmware, resident software, microcode, etc, and may take the form of a computer program product accessible from a computer-usable or computer-readable medium providing program code for use by or in connection with a computer or any instruction execution system, such as host processor 202, sensor processor 208 or any other processing resources of device 200.

Sensor processor 208 and pressure sensor 212 may be formed on different chips, or as shown, may reside on the same chip. A sensor fusion algorithm employed to calculate the orientation of device 200 may be performed externally to sensor processor 208 and MPU 206, such as by host processor 204, or may be performed by MPU 206. A chip may be defined to include at least one substrate typically formed from a semiconductor material. A single chip may be formed from multiple substrates, where the substrates are mechanically bonded to preserve the functionality. A multiple chip includes at least two substrates, wherein the two substrates are electrically connected, but do not require mechanical bonding. A package provides electrical connection between the bond pads on the chip to a metal lead that can be soldered to a PCB. A package typically comprises a substrate and a cover. Integrated Circuit (IC) substrate may refer to a silicon substrate with electrical circuits, typically CMOS circuits. One or more sensors may be incorporated into the package if desired using any suitable technique. In some embodiments, a sensor may be MEMS-based, such that a MEMS cap provides mechanical support for the MEMS structure. The MEMS structural layer is attached to the MEMS cap. The MEMS cap is also referred to as handle substrate or handle wafer. In some embodiments, the first substrate may be vertically stacked, attached and electrically connected to the second substrate in a single semiconductor chip, while in other embodiments, the first substrate may be disposed laterally and electrically connected to the second substrate in a single semiconductor package. In one embodiment, the first substrate is attached to the second substrate through wafer bonding, as described in commonly owned U.S. Pat. No. 7,104,129, which is incorporated herein by reference in its entirety, to simultaneously provide electrical connections and hermetically seal the MEMS devices. This fabrication technique advantageously enables technology that allows for the design and manufacture of high performance, multi-axis, inertial sensors in a very small and economical package. Integration at the wafer-level minimizes parasitic capacitances, allowing for improved signal-to-noise relative to a discrete solution. Such integration at the wafer-level also enables the incorporation of a rich feature set which minimizes the need for external amplification.

Figure 3:
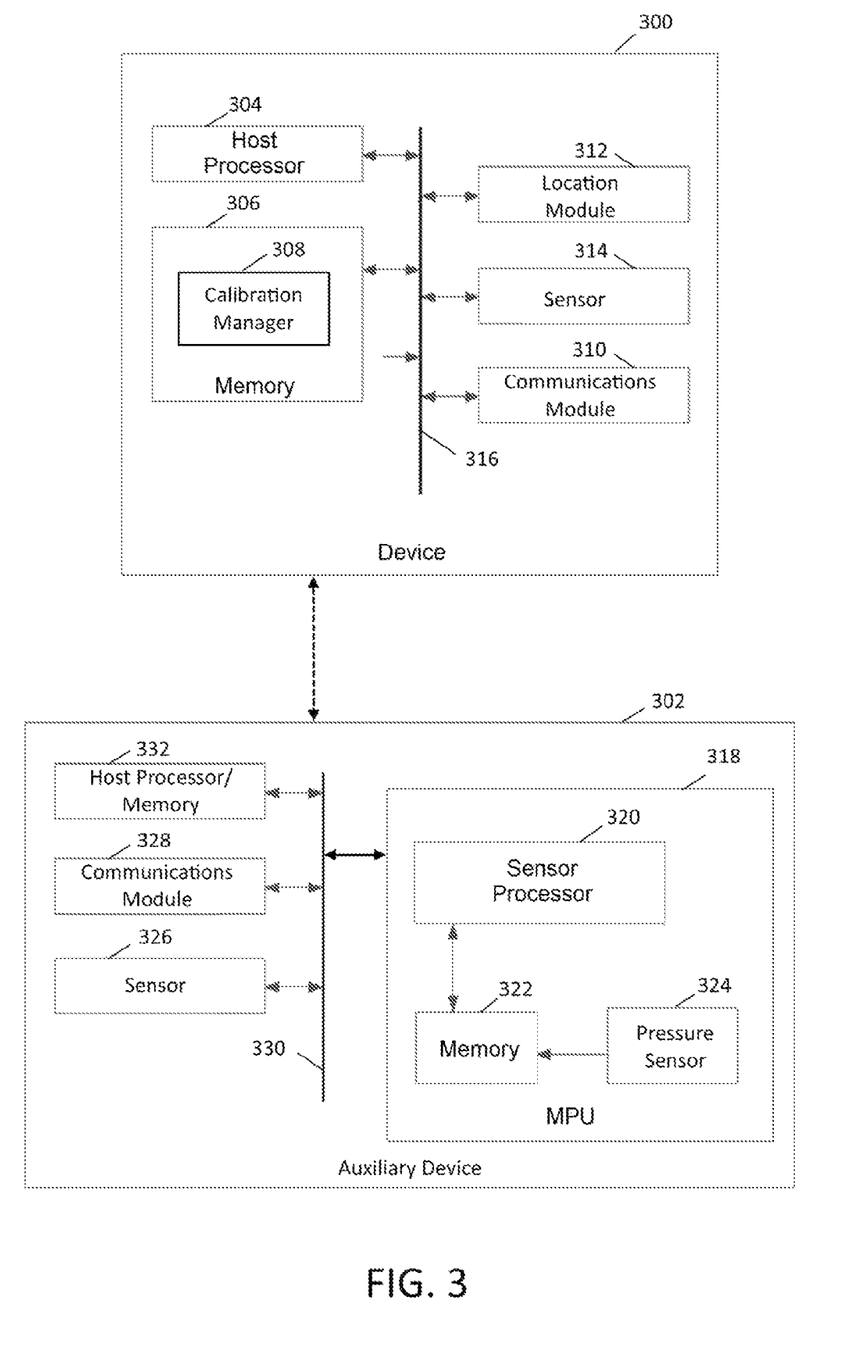
FIG. 3 is schematic diagram of a mobile device with an associated auxiliary device having a pressure sensor according to an embodiment.

Another suitable embodiment of this disclosure is shown schematically in FIG. 3 with reference to mobile device 300 and auxiliary device 302. As described above, auxiliary device 302 may be associated with mobile device 300 such as in the use case of a wearable being employed together with a smart phone. In one aspect, auxiliary device 302 may be sufficiently proximate when associated with device 300 so that position determinations made by device 300 also correspond to auxiliary device 302. Accordingly, auxiliary device 302 may be within a range of approximately 10 m in one embodiment. Mobile device 300 and auxiliary device 302 may include generally similar components to those described with regard to FIG. 2. For example, device 300 may include host processor 304 and host memory 306, with calibration manager 308 to provide the above functionality. Device 300 may also have communications module 310, location module 312 and, if desired, an external sensor 314 that is on-board device 300. The components may be coupled by bus 316. Correspondingly, auxiliary device 302 may include MPU 318, having sensor processor 320, memory 322 and pressure sensor 324. Auxiliary device 302 may have one or more additional sensor 326 as desired. The components of auxiliary device 302 may be coupled to communications module 328 using bus 330. A link between communications module 328 and communications module 312 may be used to transfer measurements of atmospheric pressure obtained by pressure sensor 324 and to implement calibration of pressure sensor 324 by calibration manager 308 using the reference pressure information obtained from an external source. Communications between device 300 and auxiliary device 302 may employ any desired wired or wireless protocol as described above. Further, communications module 310 may use multiple communication protocols. For example, it may be desirable to use a shorter range, low power communication protocol such as BLUETOOTH®, ZigBee®, ANT, NFC, or a wired connection between device 300 and auxiliary device 302 while employing a longer range communication protocol, such as a transmission control protocol, internet protocol (TCP/IP) packet-based communication, accessed using a wireless local area network (WLAN), cell phone protocol or the like, when communicating with an external source of reference pressure information, such as server 110 or other device 112 as depicted in FIG. 1. Although depicted as being implemented in device 300, the functions of calibration manager 308 may be performed using corresponding processing and memory resource in either device 300, device 302 or in any suitable division between the devices, such as by host processor/memory 332.

Figure 4:
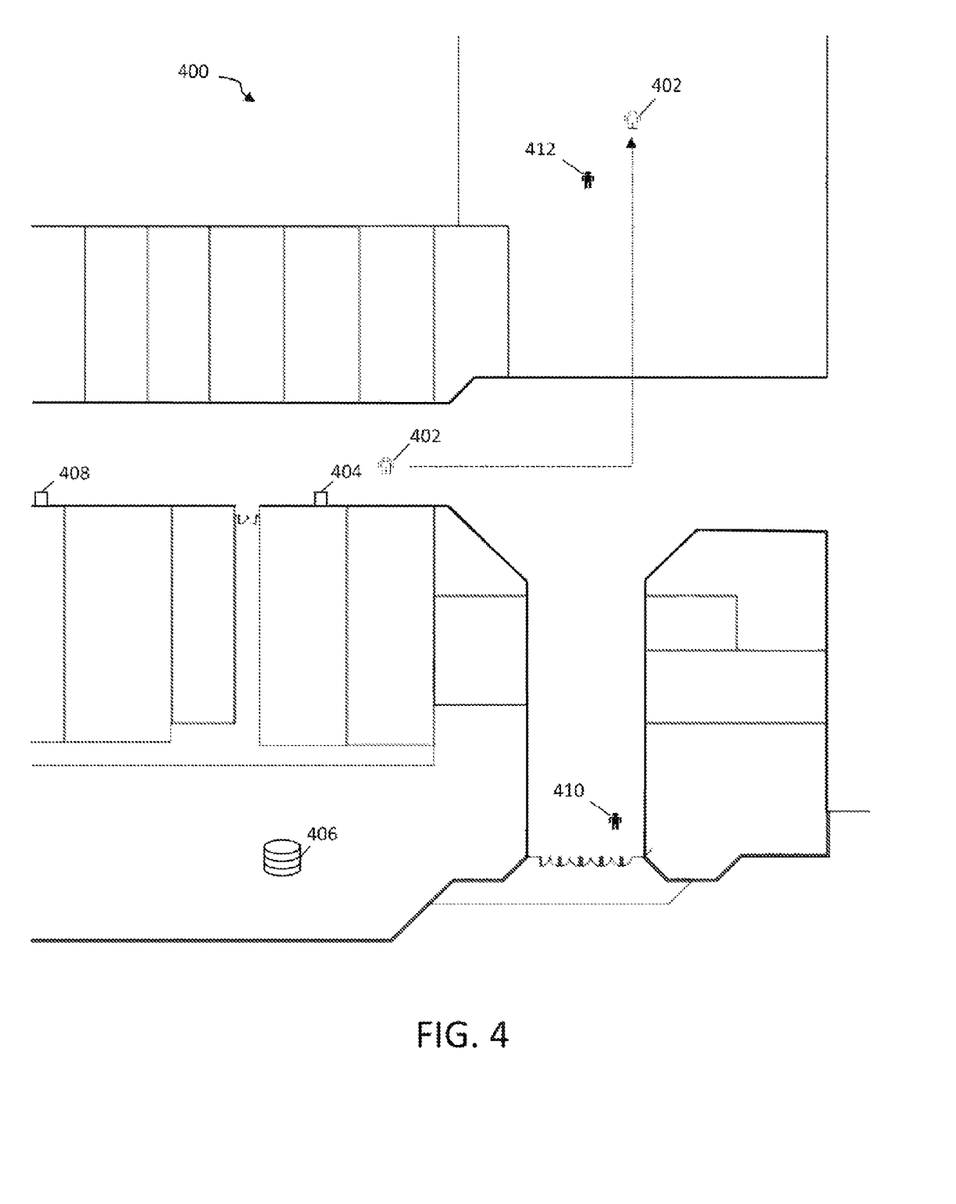
FIG. 4 is a schematic diagram showing exemplary conditions for calibrating a pressure sensor associated with a mobile device according to an embodiment.

Examples of pressure sensor calibration, such as may be performed by mobile device 102, 200 and/or 300, are depicted with reference to a schematic map of an indoor shopping mall 400 is depicted in FIG. 4. User 402 may have a mobile device configured to calibrate a pressure sensor using external reference pressure information of an external pressure sensor 404 according to the techniques of this disclosure. In one aspect, user 402 may be within a suitable threshold distance of a fixed, external pressure sensor 404. Upon determination of proximity to external pressure sensor 104, the mobile device of user 402 may receive corresponding reference pressure information from the external pressure sensor 404 and perform a calibration process. As described above, communication may occur directly between the mobile device of user 402 and the external sensor, or may be mediated through a remote server 406. Although depicted as being within shopping mall 400, the location of server 406 is not limited.

In another aspect, user 102 may not be sufficiently proximate to any one source of reference pressure information such as the external pressure sensor 404. Accordingly, the mobile device of user 402 may receive reference pressure information from multiple sources, such as external pressure sensor 408 and a mobile device associated with user 410. Any suitable number of sources may be employed. As noted above, the mobile device of user 402 may be configured to weight the reference pressure information received from multiple sources based on criteria such as proximity or reliability when performing the calibration operation.

In yet another aspect, user 402 may travel to a different location as indicated. When the pressure sensor of user 402's mobile device is considered to be sufficiently calibrated, it may provide reference pressure information for use by another device. As shown, user 412 may have a mobile device that receives reference pressure information from the mobile device of user 402 to perform a calibration operation. The reference pressure information may be communicated directly between devices or may be delivered over a network, such as by server 406.

Figure 5:
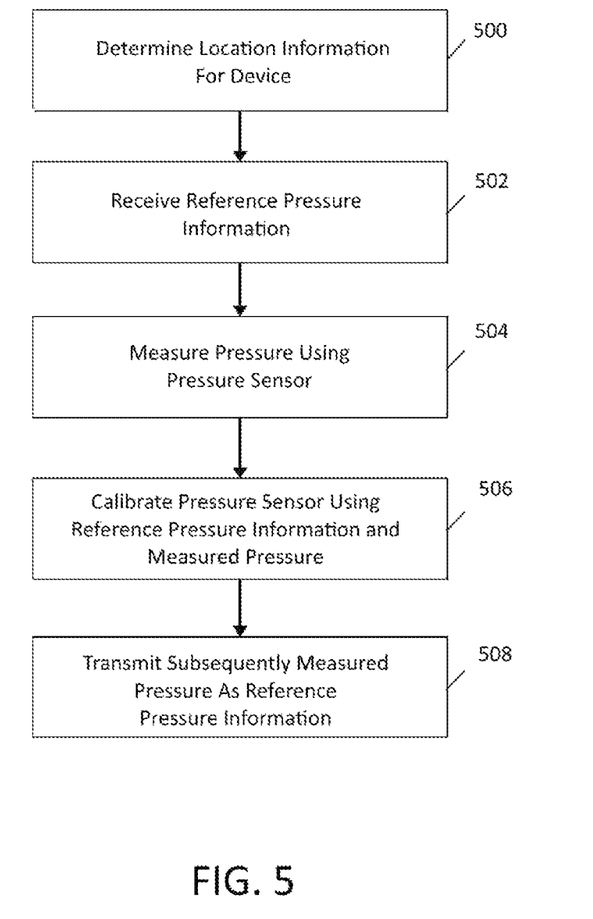
FIG. 5 is flowchart showing a routine for calibrating a pressure sensor associated with a mobile device according to an embodiment.

To help illustrate aspects of this disclosure, FIG. 5 depicts a flowchart showing a process for calibrating a pressure sensor associated with a mobile device. Although described in reference to the embodiment depicted in FIG. 2, the routine may be performed by any of the embodiments of this disclosure, including embodiments in which the pressure sensor is in an auxiliary device, such as shown in FIG. 3. Beginning with 500, a position of device 200 may be determined, such as by using location module 224. In 502, reference pressure information may be received from any number of suitable external sources, including a server, another mobile device or a fixed sensor installation. Pressure may then be measured at device 200 using pressure sensor 214 in 504. Then, in 506, calibration manager 228 may calibrate pressure sensor 214 using the measured pressure and the reference pressure information. As desired, device 200 may transmit a subsequently measured pressure as reference pressure information, to be used in a calibration process performed by a different device.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the present invention.

What is claimed is:

1. A method for calibrating a pressure sensor associated with a mobile device comprising:
   determining location information for the mobile device;
   receiving reference pressure information from an external source based at least in part on the determined location information;
   measuring pressure with the pressure sensor; and
   calibrating the pressure sensor using the measured pressure and the reference pressure information; wherein the reference pressure information and the measured pressure correspond to different time periods.

2. The method of claim 1, further comprising compensating at least one of the reference pressure information and the measured pressure with an additional environmental variable.

3. The method of claim 2, further comprising measuring the additional environmental variable with an environmental sensor associated with the mobile device.

4. The method of claim 1, wherein the pressure sensor is integrated with the mobile device.

5. The method of claim 1, further comprising forming a personal area network (PAN) between the pressure sensor and the mobile device to communicate the measured pressure.

6. The method of claim 1, wherein the reference pressure information is received from a server configured to correlate pressure information and location.

7. The method of claim 1, wherein the reference pressure information is determined by another mobile device.

8. The method of claim 7, further comprising receiving the reference pressure information from the other mobile device when the other mobile device is within a threshold proximity.

9. The method of claim 7, wherein the reference pressure information determined by the other mobile device is aggregated by a server, further comprising receiving the reference pressure information from the server.

10. The method of claim 1, further comprising transmitting a calibrated measured pressure as reference pressure information.

11. The method of claim 10, further comprising transmitting an additional environmental variable corresponding to the calibrated measured pressure.

12. The method of claim 1, further comprising receiving reference pressure information from a plurality of external sources.

13. The method of claim 1, further comprising updating the pressure sensor calibration with subsequently received reference pressure information.

14. The method of claim 1, further comprising determining a usage condition for the pressure sensor and adjusting the calibration based at least in part on the determined usage condition.

15. The method of claim 14, further comprising processing motion sensor data from at least one sensor associated with the mobile device to determine the usage condition.

16. A pressure sensor system comprising:
   a mobile device;
   a pressure sensor associated with the mobile device configured to measure pressure;
   a location module configured to determine location information for the mobile device; and
   a calibration manager configured to receive reference pressure information from an external source based at least in part on the determined location information;
   wherein the calibration manager is further configured to calibrate the pressure sensor using the reference pressure information and wherein the reference pressure information and the measured pressure correspond to different time periods.

17. The pressure sensor system of claim 16, wherein the calibration manager is further configured to compensate at least one of the reference pressure information and the measured pressure with an additional environmental variable.

18. The pressure sensor system of claim 17, further comprising an environmental sensor associated with the mobile device configured to measure the additional environmental variable.

19. The pressure sensor system of claim 16, wherein the pressure sensor is integrated with the mobile device.

20. The pressure sensor system of claim 16, wherein the pressure sensor and the mobile device further comprise a personal area network (PAN) configured to communicate the measured pressure.

21. The pressure sensor system of claim 16, wherein the calibration manager is configured to receive reference pressure information from a server that correlates pressure information and location.

22. The pressure sensor system of claim 16, wherein the calibration manager is configured to receive reference pressure information determined by another mobile device.

23. The pressure sensor system of claim 21, wherein the calibration manager is further configured to receive the reference pressure information from the other mobile device when the other mobile device is within a threshold proximity.

24. The pressure sensor system of claim 21, wherein the calibration manager is further configured to receive the reference pressure information from a server that aggregates the pressure information determined by the other mobile device.

25. The pressure sensor system of claim 16, wherein the calibration manager is further configured to transmit a calibrated measured pressure as reference pressure information.

26. The pressure sensor system of claim 25, further comprising an environmental sensor associated with the mobile device configured to measure the additional environmental variable, wherein the calibration manager is further configured to transmit the measured additional environmental variable with the calibrated measured pressure.

27. The pressure sensor system of claim 16, wherein the calibration manager is further configured receive reference pressure information from a plurality of external sources.

28. The pressure sensor system of claim 16, wherein the calibration manager is further configured to update the pressure sensor calibration with subsequently received reference pressure information.

29. The pressure sensor system of claim 16, wherein the calibration manager is further configured to determine a usage condition for the pressure sensor and adjust the calibration based at least in part on the determined usage condition.

30. The pressure sensor system of claim 29, wherein the calibration manager determines the usage condition with data from at least one motion sensor associated with the mobile device.

* * * * *